(12) United States Patent
Horiuchi et al.

(10) Patent No.: US 10,135,487 B2
(45) Date of Patent: Nov. 20, 2018

(54) BASE STATION, TERMINAL, AND COMMUNICATION METHOD

(71) Applicant: Panasonic Intellectual Property Corporation of America, Torrance, CA (US)

(72) Inventors: Ayako Horiuchi, Kanagawa (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 15/799,503

(22) Filed: Oct. 31, 2017

(65) Prior Publication Data

US 2018/0062699 A1    Mar. 1, 2018

Related U.S. Application Data

(63) Continuation of application No. PCT/JP2016/002718, filed on Jun. 6, 2016.

(30) Foreign Application Priority Data

Jul. 24, 2015   (JP) .................. 2015-147006

(51) Int. Cl.
*H04B 7/04*   (2017.01)
*H04W 4/70*   (2018.01)
(Continued)

(52) U.S. Cl.
CPC .............. *H04B 1/713* (2013.01); *H04L 5/00* (2013.01); *H04W 4/70* (2018.02); *H04W 16/26* (2013.01); *H04W 48/10* (2013.01); *H04W 72/04* (2013.01)

(58) Field of Classification Search
CPC .... H04B 1/713; H04B 7/0495; H04B 7/2612; H04B 17/382; H04W 4/70; H04W 72/04;
(Continued)

(56) References Cited

U.S. PATENT DOCUMENTS

2012/0327895 A1    12/2012  Wallén et al.
2013/0301524 A1*   11/2013  Xu .................. H04W 48/12
                                                        370/328
(Continued)

FOREIGN PATENT DOCUMENTS

JP    2013-157699 A    8/2013
JP    2014-526160 A   10/2014

OTHER PUBLICATIONS

International Search Report of PCT application No. PCT/JP2016/002718 dated Aug. 23, 2016.
(Continued)

*Primary Examiner* — Andrew Wendell
(74) *Attorney, Agent, or Firm* — Seed IP Law Group LLP

(57) ABSTRACT

In a base station, a first setting circuitry sets a first Narrowband for allocating a system information block (SIB) for MTC by using a predetermined default offset. A second setting circuitry sets a second Narrowband for allocating a signal other than the SIB by using the default offset and an additional offset that indicates a difference from the default offset. An allocating circuitry allocates the SIB including the additional offset to the first Narrowband, and allocates the signal other than the SIB to the second Narrowband.

14 Claims, 16 Drawing Sheets

(51) Int. Cl.
    *H04W 28/02*     (2009.01)
    *H04B 1/713*     (2011.01)
    *H04W 72/04*     (2009.01)
    *H04W 16/26*     (2009.01)
    *H04L 5/00*     (2006.01)
    *H04W 48/10*     (2009.01)

(58) Field of Classification Search
    CPC ............. H04W 16/26; H04W 28/0215; H04W 52/0206
    See application file for complete search history.

(56) References Cited

U.S. PATENT DOCUMENTS

| | | | | |
|---|---|---|---|---|
| 2016/0128055 A1* | 5/2016 | Xiong | ................. | H04W 72/048 370/329 |
| 2017/0111152 A1* | 4/2017 | Blankenship | ......... | H04L 5/0051 |
| 2018/0007543 A1* | 1/2018 | Lee | ......................... | H04W 8/22 |
| 2018/0102890 A1* | 4/2018 | Yi | ......................... | H04L 5/0053 |
| 2018/0124728 A1* | 5/2018 | Xiong | .................... | H04W 4/70 |

OTHER PUBLICATIONS

3GPP TR 36.888 V12.0.0, "3rd Generation Partnership Project; Technical Specification Group Radio Access Network; Study on provision of low-cost Machine-Type Communications (MTC) User Equipments (UEs) based on LTE", Jun. 26, 2013.
3GPP TSG RAN WG1 #81, R1-153567, "WF on Narrowband Definition for Rel-13 MTC UEs", May 25, 2015.

\* cited by examiner

FIG. 3

| PRB# | RBG | Default Narrowband | | Offset −2 | Offset 0 | Offset +1 | Offset +2 |
|---|---|---|---|---|---|---|---|
| 24 | | | | | | | |
| 23 | | | | | | | |
| 22 | | | | | | | 5PRBs |
| 21 | | | | | | 6PRBs | |
| 20 | | 3PRBs | | 6PRBs | | | |
| 19 | | | | | 3PRBs | | |
| 18 | | 6PRBs | | | 6PRBs | | |
| 17 | | | | | | | 6PRBs |
| 16 | | | | 6PRBs | | 6PRBs | |
| 15 | | | | | | | |
| 14 | | | | | 6PRBs | | |
| 13 | | 6PRBs | | | | | |
| 12 | | | | | | | 6PRBs |
| 11 | | | | 6PRBs | | 6PRBs | |
| 10 | | | | | 6PRBs | | |
| 9 | | | | | | | |
| 8 | | 6PRBs | | | | | |
| 7 | | | | | | 6PRBs | 6PRBs |
| 6 | | | | 6PRBs | 6PRBs | | |
| 5 | | | | | | | |
| 4 | | | | | | | |
| 3 | | | | | | | |
| 2 | | | | | | | |
| 1 | | | | | | | |
| 0 | | | | | | | |

| PRB# | RBG | Default Narrowband |
|---|---|---|
| 5 | | |
| 4 | | |
| 3 | | 6PRBs |
| 2 | | |
| 1 | | |
| 0 | | |

FIG. 12

BASE STATION, TERMINAL, AND COMMUNICATION METHOD

BACKGROUND

1. Technical Field

The present disclosure relates to a base station, a terminal and a communication method used for machine-type communications (MTC).

2. Description of the Related Art

In recent years, machine-type communications (MTC) using a cellular network has been studied (see, for instance, 3GPP TR 36.888 V12.0.0 Machine-Type Communications (MTC) User Equipments (UEs) based on LTE). MTC is expected to have applications to automatic meter inspection, inventory management by a smart meter, physical distribution management utilizing position information, pet and livestock management, and mobile payment. It is assumed that in MTC, an MTC terminal is connected to a network. It is expected that a large amount of MTC terminals is disposed, and yet the amount of traffic of each MTC terminal is not so large. Thus, the MTC terminals preferably have a low cost, and a low power consumption. Also, an MTC terminal may be disposed in the underground of a building where radio waves do not reach easily, enhancement of the coverage is also called for.

For expansion of LTE-Advanced standardized by 3GPP, in order to achieve a low cost of MTC terminal, the following approach is considered: the resources of MTC terminal used for communication are limited to 6 physical resource blocks (PRB) or less regardless of the system bandwidth. When the system bandwidth is wider than 6 PRB, MTC terminal receives a signal in only a portion of the system bandwidth and performs transmission and reception. The PRB used for transmission and reception can be changed by retuning. The resources of 6 PRB or less are called Narrowband. It is stipulated that Narrowband is formed by consecutive PRBs. As the definition of Narrowband, several methods have been proposed, including a method of forming Narrowband by dividing a band into 6 PRB each from one end of the band, and a method of forming Narrowband by dividing a band from the center of the band (see, for instance, R1-153567 "WF on Narrowband Definition for Rel-13 MTC UEs").

In LTE, a RBG size, which indicates the number of RBs that constitute one resource block group (RBG), is defined according to the number of RBs included in the system bandwidth. The RBG is a resource obtained by dividing the band into a number of consecutive PRBs from one end of the band sequentially, the number is being specified by the RBG size. The RBG size is a parameter used for type 0, type 1 resource allocation for DL. In type 0 resource allocation, resources are allocated in units of RBG. In type 1, each RBG belongs to one of subsets. The number of subsets is the same as the RBG size. In resource allocation, a subset is selected first, and resources are allocated to each of multiple PRBs in each RBG belonging to the selected subset. Like this, RBG is related to the unit of resource allocation of terminals (legacy UE) in related art.

Also, as a method of connecting to a network, an MTC terminal may receive control information stepwise. First, similarly to a terminal in related art, the MTC terminal receives a master information block (MIB). The MIB is placed on 72 carriers (equivalent to 6 PRB) positioned at the center of the system bandwidth, thus an MTC terminal, which performs transmission and reception by Narrowband, can also perform reception by tuning to the central frequency. However, a system information block (SIB) subsequently received by a terminal in related art includes unwanted information for the MTC terminal, and may be transmitted to a broad band. Thus, setting of a SIB for MTC is being studied so that the SIB may be received by the MTC terminal. Thus, the following approach is being studied: the MTC terminal is notified of a transport block size (TBS) of MTC SIB1 using a spare bit prepared in the MIB, and the location of PRB in which MTC SIB1 is placed is determined based an ID called PCID that identifies an cell. The MTC terminal receives MTC SIB1 by retuning to a Narrowband, in which MTC SIB1 is placed, in accordance with the notification of MIB.

SUMMARY

The definitions of Narrowband set for MTC terminal may be different depending on cells. The definition of Narrowband is the PRBs that constitute the Narrowband. Particularly in UL, settings may be made so that PUCCH resources are reserved for a terminal (legacy UE) in related art, and the PUCCH resources are not included in the Narrowband of MTC. Since the amount of PUCCH resources varies with cells, it is possible to define Narrowband for each cell. Furthermore, in TDD, it is specified that DL and UL adopt the same definition for Narrowband, and even in FDD, when a request of maintaining a uniform interval between the Narrowband of DL and the Narrowband of UL is made, the same definition has to be adopted. When DL and UL adopt the same definition, the Narrowband of DL is affected by the amount of PUCCH resources of UL.

A terminal in related is notified of pusch-Hopping Offset via SIB2 so that a PUSCH region, which is a data region, may be set according to the amount of PUCCH resources. In contrast, an MTC terminal is unable to receive SIB2 which is for terminals in related art and transmitted via a broad band, and thus the MTC terminal has to be separately notified of information indicating a resource region for the MTC terminal corresponding to the above-mentioned pusch-Hopping Offset, that is, the definition of Narrowband. As a method of notifying of the definition of Narrowband, use of MIB may be considered. However, the spare bit prepared in the MIB is 10 bits, and when future expansion of the system is considered, reduction in the number of bits used for MTC terminals is called for. In other words, minimization of information notified via MIB is called. Therefore, before an MTC terminal receives the definition of Narrowband, the MTC terminal has to receive control information using Narrowband.

One non-limiting and exemplary embodiment provides a base station, a terminal, and a communication method that allow the MTC terminal to receive SIB1 for MTC without receiving the definition of Narrowband.

In one general aspect, the techniques disclosed here feature s base station including: a first setting circuitry that sets a first Narrowband for allocating a system information block (SIB) 1 for MTC by using a predetermined default offset; a second setting circuitry that sets a second Narrowband for allocating a signal other than the SIB 1 by using the default offset and an additional offset that indicates a difference from the default offset; and an allocating circuitry that allocates the SIB 1 including the additional offset to the first Narrowband, and allocates the signal other than the SIB 1 to the second Narrowband.

It should be noted that general or specific embodiments may be implemented as a system, a method, an integrated circuit, a computer program, a storage medium, or any selective combination thereof.

According to an aspect of the present disclosure, the MTC terminal can receive SIB1 for MTC without receiving the definition of Narrowband.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a diagram illustrating a setting example of Narrowband when the bandwidth is 5 MHz and the number of RBs is 25;

FIG. 4 is a diagram illustrating a setting example of Narrowband when the bandwidth is 10 MHz and the number of RBs is 50;

FIG. 6 is a diagram illustrating a setting example of Narrowband when the bandwidth is 20 MHz and the number of RBs is 100;

FIG. 7 is a diagram illustrating a setting example of Narrowband when the bandwidth is 3 MHz and the number of RBs is 15;

FIG. 8 is a diagram illustrating a setting example of Narrowband when the bandwidth is 1.4 MHz and the number of RBs is 6;

FIG. 12 is a diagram illustrating an operation example of FDD with a frequency hopping period of 10;

DETAILED DESCRIPTION

Hereinafter, an embodiment of the present disclosure will be described in detail with reference to the drawings.

Figure 1:
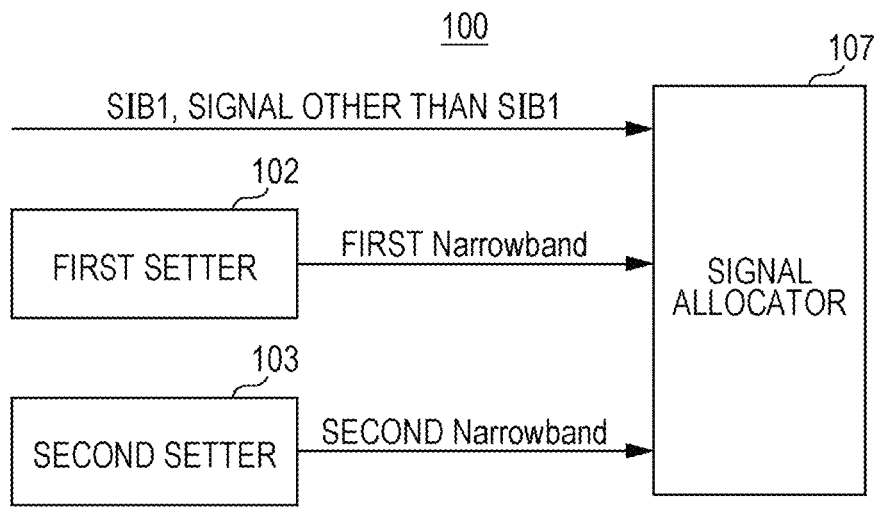
FIG. 1 is a block diagram illustrating the principal configuration a base station according to an embodiment.

FIG. 1 is a block diagram illustrating the principal configuration a base station 100 according to the embodiment of the present disclosure. In the base station 100 illustrated in FIG. 1, a first setter (default Narrow band setter) 102 sets a first Narrowband in which a system information block (SIB) 1 for MTC is placed, using a predetermined default offset. A second setter (Narrow band setter) 103 sets a second Narrowband in which a signal other than SIB1 is placed, using a default offset and an additional offset which indicates a difference from the default offset. An allocator (signal allocator) 107 allocates SIB1 including the additional offset to the first Narrowband, and a signal other than SIB1 to the second Narrowband.

Figure 2:
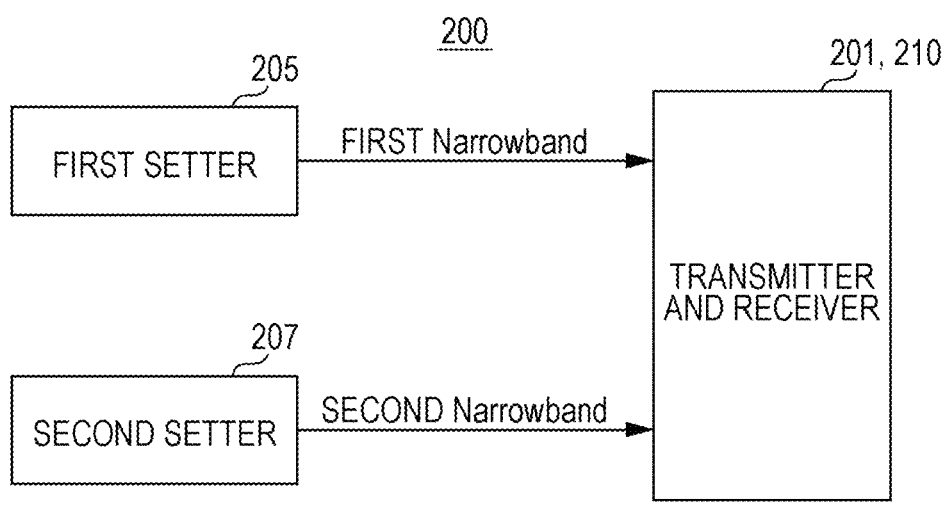
FIG. 2 is a block diagram illustrating the principal configuration of a terminal according to an embodiment.

FIG. 2 is a block diagram illustrating the principal configuration of a terminal 200 according to the embodiments of the present disclosure. In the terminal 200 illustrated in FIG. 2, a first setter (default Narrow band setter) 105 sets the first Narrowband in which a system information block (SIB) 1 for MTC is placed, using a predetermined default offset. A second setter (Narrow band setter) 207 sets a second Narrowband in which a signal other than SIB1 is placed, using a default offset and an additional offset which is included in SIB1 and which indicates a difference from the default offset. Transceivers (a transmitter, a receiver) 201, 210 receive SIB1 by the first Narrowband, and transmit and receive a signal other than SIB1 by the second Narrowband.

(First Embodiment)

A default offset is set to the Narrowband in which MTC SIB1 is placed, and PRB included in the Narrowband is defined based on the default offset which is set. In addition, definition of Narrowband for MTC resources other than MTC SIB1 is notified via MTC SIB1. The notification is made in the form of additional offset from the default offset. When no change is made from the default offset, the notification includes a parameter indicating that a predetermined offset is not changed. In this manner, since the default offset is specified in advance, an MTC terminal is able to receive SIB1 for MTC without receiving the definition of Narrowband. Also, the data other than MTC SIB1 may not be changed when the predetermined offset works, or may be changed when the predetermined offset is desired to be changed.

<Operations>

The base station and the MTC terminal share the definition of Narrowband in which MTC SIB1 is placed in advance. Table illustrates an example of a method of setting a RBG size for each of system bandwidth ranges, the definition of Narrowband shared in advance between the base station and the MTC terminal (default offset), and an additional offset. The definition of Narrowband is shared between the base station and the MTC terminal as the default offset of Narrowband, and the default offset indicates an offset in terms of PRB from the end of the system band, at which Narrowband is placed. The additional offset indicates a difference by which the default offset is changed, and is notified via MTC SIB1.

TABLE

| System Bandwidth (RBs) | RBG Size | Default offset of Narrow band | Additional offset in MTC SIB1 |
|---|---|---|---|
| ≤10 | 1 | 0 | — |
| 11-26 | 2 | 1 for 3 MHz (15 RBs) | −1, 0, +1, +2 |
|  |  | 2 for 15 MHz (25 RBs) | −2, 0, +1, +2 |
| 27-63 | 3 | 3 | −3, 0, +1, +3 |
| 64-110 | 4 | 4 | −4, −2, 0, +2 |

In this embodiment, the definition of Narrowband for MTC SIB1 is set for each bandwidth. LTE supports the bandwidths of 20 MHz (100 RBs), 15 MHz (75 RBs), 10 MHz (50 RBs), 5 MHz (25 RBs), 3 MHz (15 RBs), and 1.4 MHz (6 RBs), and a bandwidth to be used is notified via MIB. A larger default offset is set for a larger bandwidth.

This is because a larger bandwidth allows a greater number of users to be served, and the amount of resources necessary for PUCCH is increased. Also, for the RBG sizes 2, 3, 4, the default offset and RBG size are made equal. This is for the purpose of reducing the number of RBGs overlapping with Narrowband when Narrowband is set to 6 PRB. However, when the bandwidth is 3 MHz (15 RBs) and the RBG size is 2, the number of RBs included in the bandwidth is small, and thus the default offset is set to 1 to reserve the number Narrowbands.

FIG. 3 illustrates a setting example of Narrowband when the bandwidth is 5 MHz (the number of RBs is 25). When the number of RBs is 25, the default offset is 2, and thus 2 PRBs at both ends of the band is not included in the area for placement of Narrowband. Therefore, Narrowband is placed from PRB #2 to PRB #22. When each Narrowband is defined for 6 PRBs, 3 PRBs remain. When the 3 PRBs are used as a Narrowband, the number of Narrowbands is 4, and when the 3 PRBs are not used as a Narrowband, the number of Narrowbands is 3. As illustrated in FIG. 3, when the start position in the frequency axis of Narrowband is aligned with the end of one of RBGs, 3 RBGs are included in the Narrowband. However, when the start position of Narrowband is not aligned with the end of a RBG, Narrowband overlaps with four RBGs. However, when the number of RBGs overlapping with a Narrowband increases and Narrowbands are used, the number of RBGs not usable by a terminal in related art increases. Therefore, it is desirable that the end of each Narrowband be aligned with the end of a RBG in the frequency axis.

Figure 4:
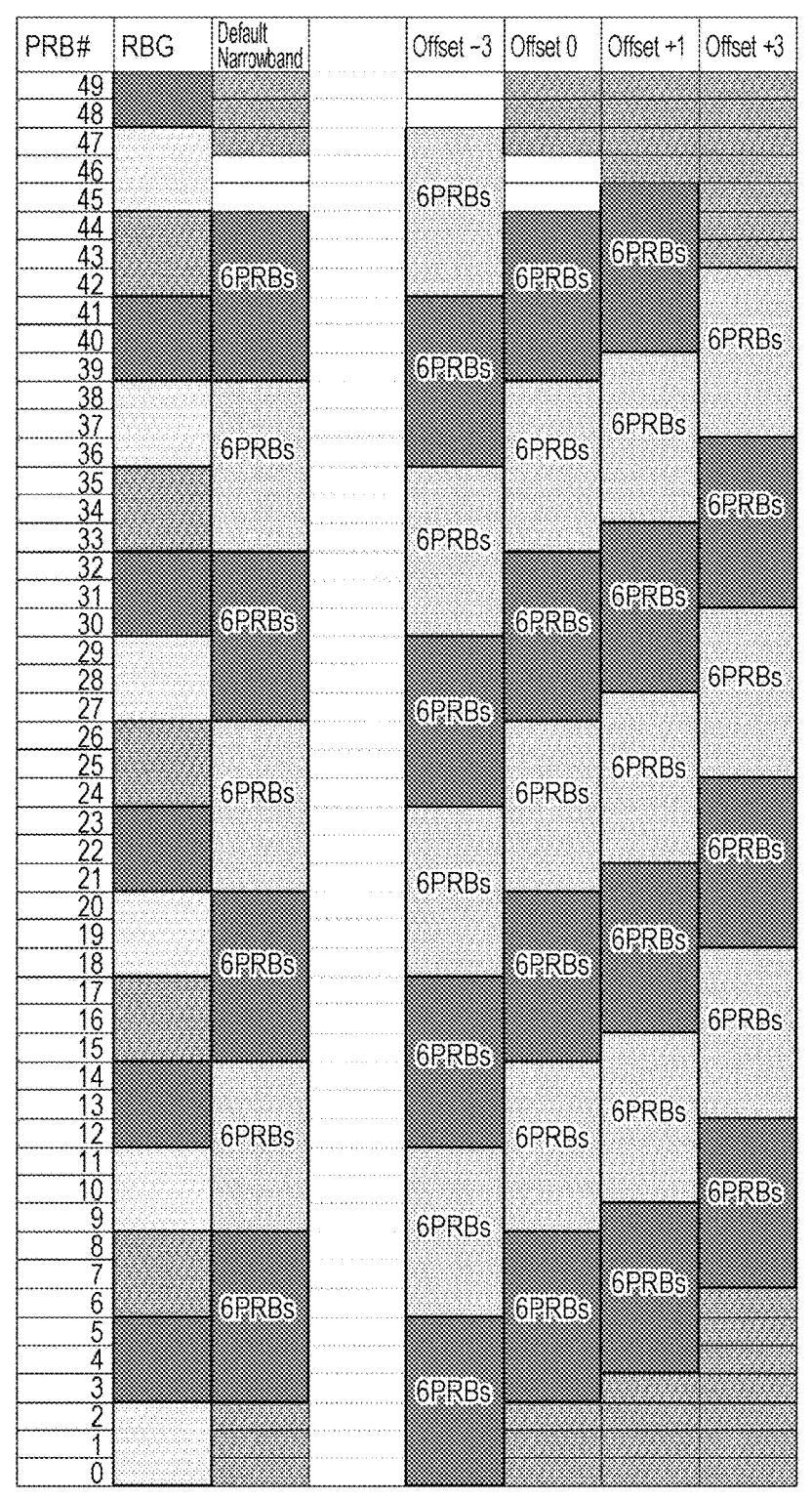
Figure 5:
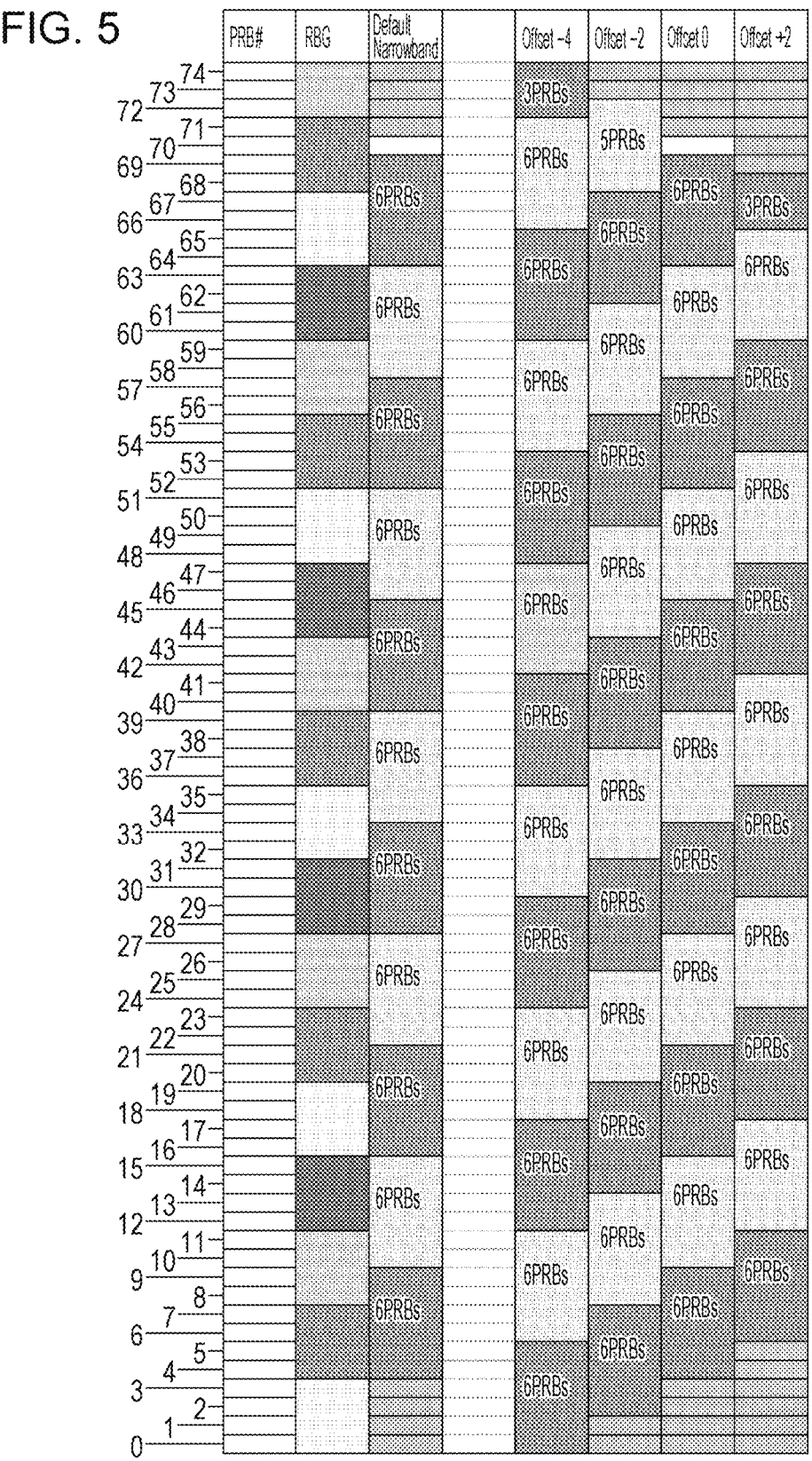
FIG. 5 is a diagram illustrating a setting example of Narrowband when the bandwidth is 15 MHz and the number of RBs is 75.
Figure 6:
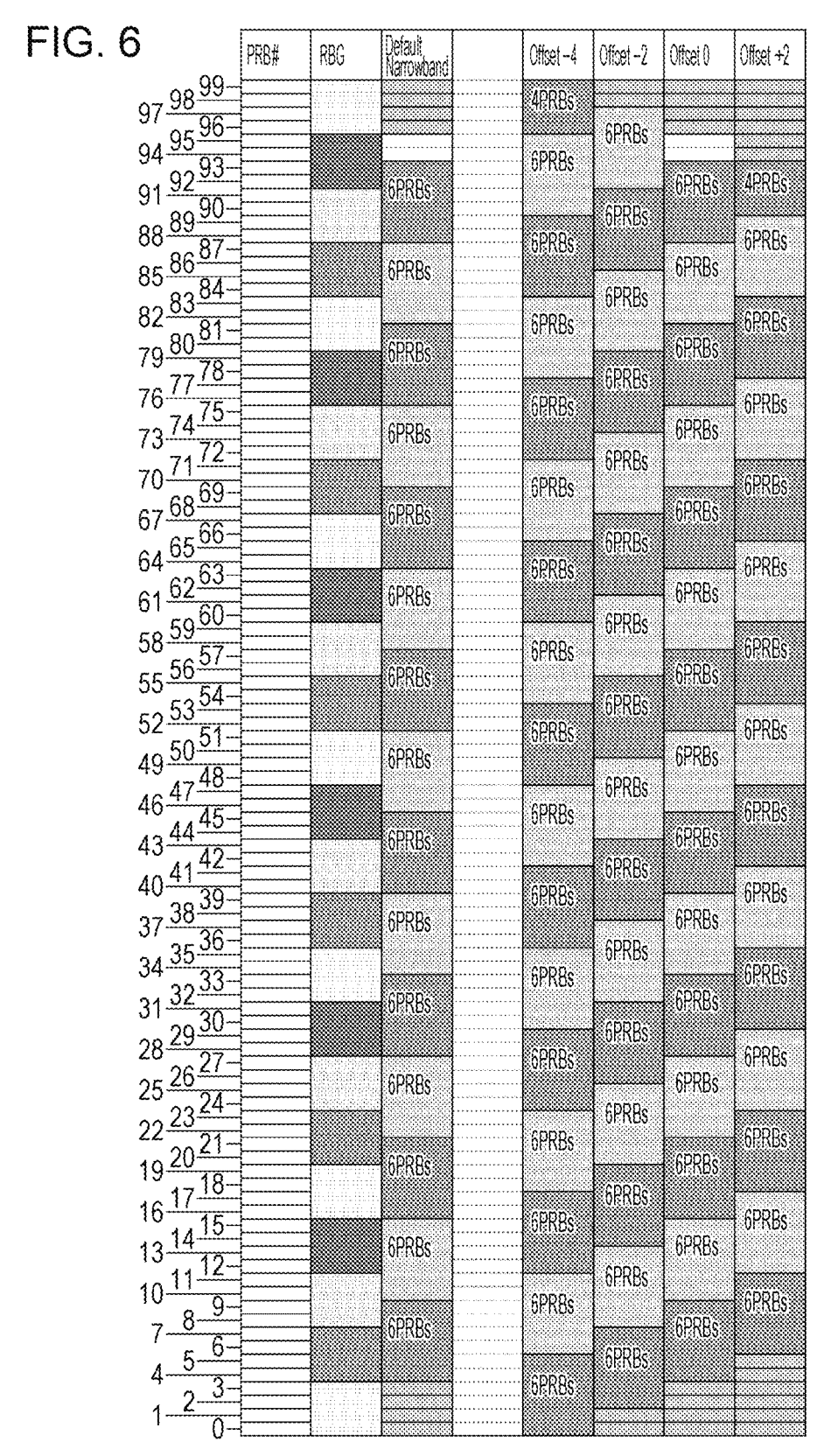

The additional offset is notified via MTC SIB1. In Table, as an example, the additional offset is constituted by 2 bits so that notification of additional offset in 4 patterns may be performed. In this case, setting of an additional offset of 0 is included so that notification that the default offset is not changed may be performed. In this embodiment, a negative value of offset is also prepared so that setting to allow Narrowband to be used from the end of the band is also included. This is because when communication is often performed without using all PRBs in Narrowband due to better line quality of many MTC terminals, allocation of resources causing a conflict with PUCCH resources is avoidable by a scheduler of the base station. The offset+1 allows Narrowband to be placed from PRB #3 to PRB #21. In this case, when each Narrowband is defined for 6 PRBs from #3, 1 PRB remains. When the 1 PRB is not used as a Narrowband, the setting for Narrowband is shifted by 1 PRB and each Narrowband is set for 6 PRBs from #4, and thus the Narrowbands include 3 RBGs, and the number of RBGs blocked by the Narrowbands can be reduced. In this embodiment, each Narrowband is set to 3 PRBs or greater and 6 PRBs or less. FIG. 4, FIG. 5, and FIG. 6 illustrate examples of the bandwidth 10 MHz (50 RB), the bandwidth 15 MHz (75 RB), and the bandwidth 20 MHz (100 RB), respectively. The values in Table are used for the default offset and the additional offset.

<In Case of 3 MHz (15 RB)>

Figure 7:
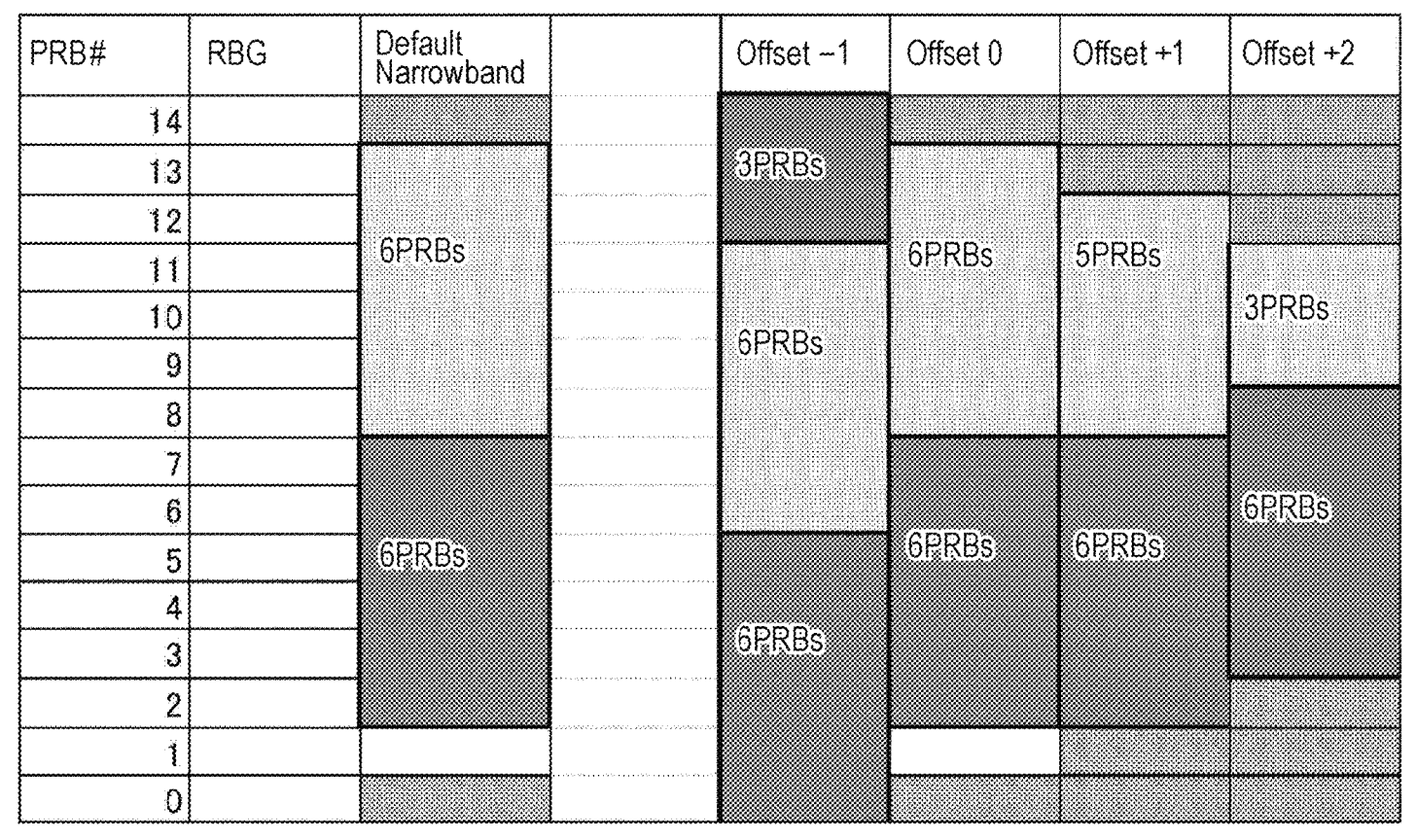

As illustrated in FIG. 7, when the bandwidth is 3 MHz (15 RB), if the default offset is set to 2 as illustrated in Table, the area where Narrowband can be placed is 11 PRBs from PRB #2 to PRB #12, and only one Narrowband with 6 PRBs can be set. Thus, when the bandwidth is 3 MHz (15 RB), the default offset may be set to 1, and two Narrowbands with 6 PRBs may be reserved. In this case, when the remaining 1 PRB (for instance, PRB #1) is not set as a Narrowband, setting for Narrowband is further shifted by 1 PRB. That is, when each Narrowband is reserved for 6 PRBs from #2, each Narrowband includes 3 RBGs while reserving two Narrowbands, and the number of RBGs blocked by the Narrowbands can be reduced.

<In Case of 1.4 MHz (6 RB)>

Figure 8:
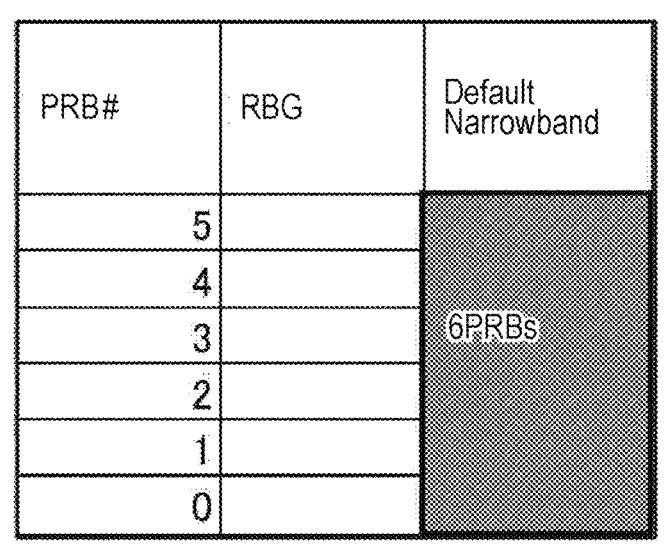

As illustrated in FIG. 8, when the bandwidth is 1.4 MHz (6 RB), only one Narrowband with 6 PRBs can be set. Thus, the default offset is set to 0, and the additional offset is not set.

<Configuration of Base Station>

Figure 9:
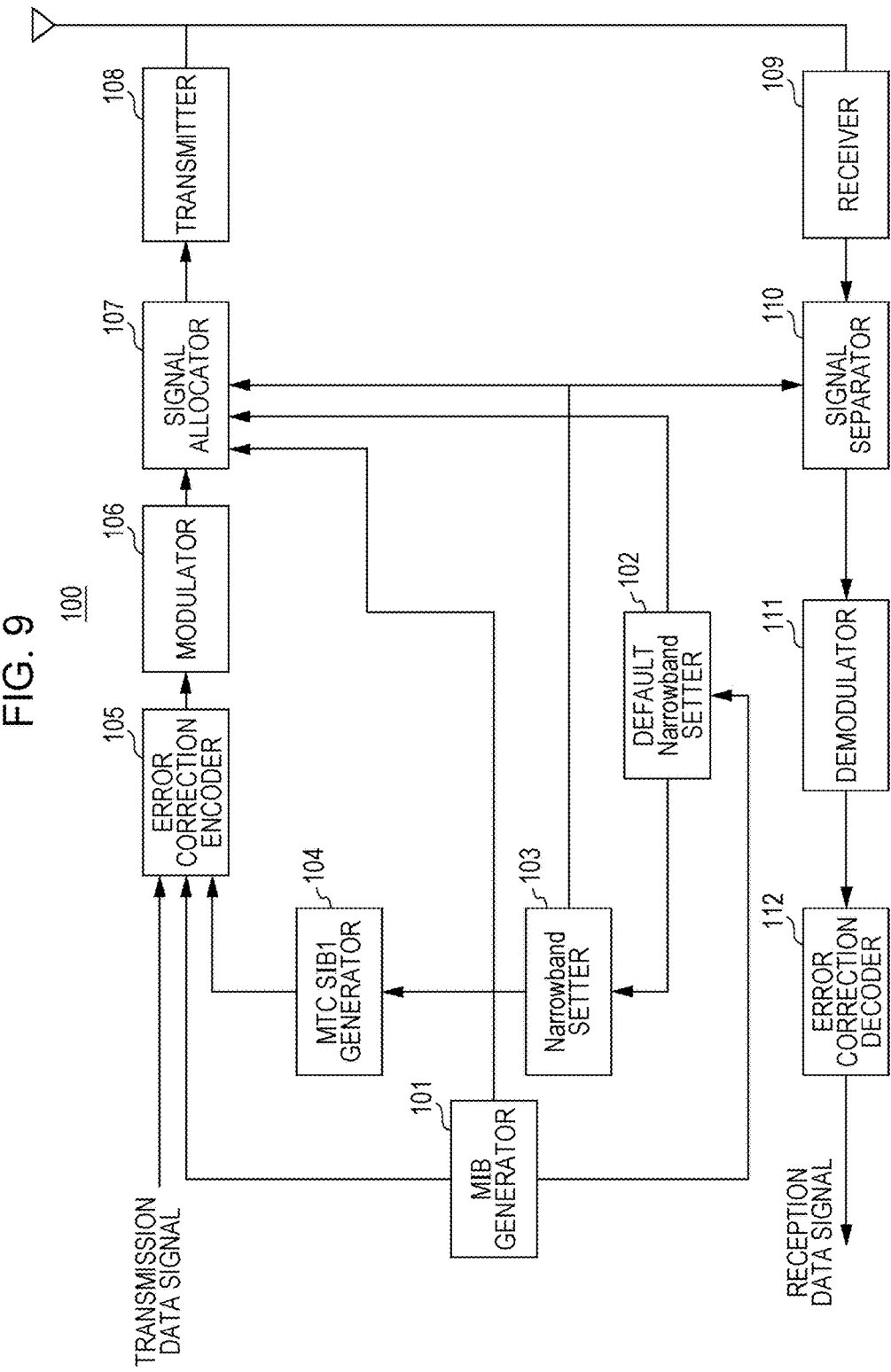
FIG. 9 is a block diagram illustrating the configuration of a base station according to the embodiment.

FIG. 9 is a block diagram illustrating the configuration of the base station according to this embodiment. In FIG. 9, the base station 100 includes an MIB generator 101, a default Narrowband setter 102, a Narrowband setter 103, an MTC SIB1 generator 104, an error correction encoder 105, a modulator 106, a signal allocator 107, a transmitter 108, a receiver 109, a signal separator 110, a demodulator 111, and an error correction decoder 112.

The MIB generator 101 generates an MIB that is a control signal including information on bandwidth, setting of PHICH, a system frame number, and a transport block size (TBS) of MTC SIB1 notified using a spare bit, and outputs the MIB to the error correction encoder 105, the default Narrowband setter 102, and the signal allocator 107.

The default Narrowband setter 102 refers to the information on the bandwidth inputted from the MIB generator 101 and the default Narrowband for each band stored in a table in advance, and sets the default Narrowband. The default Narrowband setter 102 outputs the default Narrowband to the Narrowband setter 103 and the signal allocator 107.

The Narrowband setter 103 selects an additional offset of Narrowband from predetermined values based on the information including the default Narrowband, the number of users served by another base station which is not illustrated, the needed amount of PUCCH resources, and the line quality of each MTC terminal, and sets the definition of Narrowband. The Narrowband setter 103 outputs the selected additional offset to MTC SIB1 generator 104, and outputs the definition of Narrowband to the signal allocator 107.

The MTC SIB1 generator 104 generates a control signal for MTC including the additional offset of Narrowband inputted from the Narrowband setter 103, and outputs the control signal to the error correction encoder 105.

The error correction encoder 105 receives input of a transmission data signal (DL data signal), an MIB received from the MIB generator 101, and an MTC SIB1 received from MTC SIB1 generator 104, and performs error correction encoding on the inputted signals to output the error correction encoded signals to the modulator 106.

The modulator 106 performs modulation processing on the signal received from the error correction encoder 105, and outputs the modulated data signal to the signal allocator 107.

The MIB, MTC SIB1, and transmission data signal are allocated by the signal allocator 107. The MIB is allocated to the central frequency of the band. The MTC SIB1 is allocated to the default Narrowband based on the default Narrowband received from the default Narrowband setter 102, the transport block size (TBS) of MTC SIB1 received from the MIB, a Narrowband number defined by the cell ID, and a predetermined transmission period. The transmission data signal is allocated to Narrowband based on the definition of Narrowband received from the Narrowband setter 103 and resource allocation information which is not illustrated.

The control signal and the data signal are allocated to predetermined resources in this manner, thus a transmission signal is formed. The formed transmission signal is outputted to the transmitter 108.

The transmitter 108 performs wireless transmission processing such as up converting on an input signal, and transmits the signal to the terminal 200 via an antenna.

The receiver 109 receives the signal transmitted from the terminal 200 via an antenna, and outputs the signal to the signal separator 110. The signal separator 110 separates a received signal based on the information inputted from the Narrowband setter 103, and outputs the signal to the demodulator 111. The demodulator 111 performs demodulation processing on an input signal, and outputs an obtained signal to the error correction decoder 112. The error correction decoder 112 decodes an input signal, and obtains reception data signal from the terminal 200.

<Configuration of MTC Terminal>

The MTC terminal receives an MTC SIB1 by retuning a Narrowband in which MTC SIB1 is placed in accordance with the notification of MIB. In addition, the MTC terminal receives MTC SIB X (X>=2) by retuning to another Narrowband in accordance with the notification of MTC SIB1, and receives the setting of other channels, for instance, Paging, RACH response, message 4, MPDCCH, MPDSCH, MPUSCH via the MTC SIB X. By receiving the control information stepwise in this manner, the resources of control information, which needs to be transmitted by all MTC terminals, can be reduced, and the resources of lower-level control information can be flexibly allocated.

Figure 10:
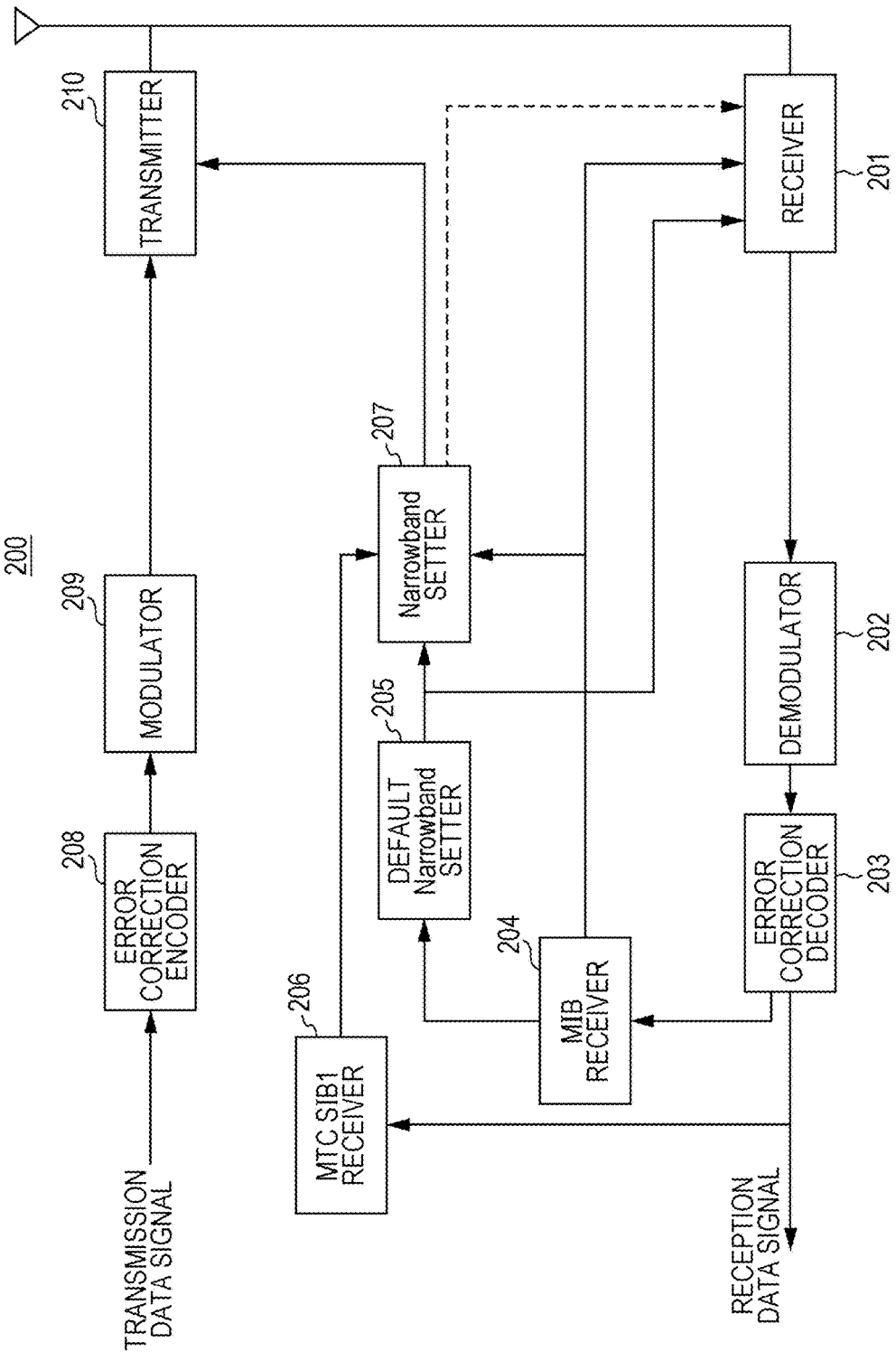
FIG. 10 is a block diagram illustrating the configuration of a terminal according to the embodiment.

FIG. 10 is a block diagram illustrating an MTC terminal configuration according to this embodiment. In FIG. 10, the terminal 200 includes a receiver 201, a demodulator 202, an error correction decoder 203, an MIB receiver 204, a default Narrowband setter 205, an MTC SIB1 sefter 206, a Narrowband setter 207, an error correction encoder 208, a modulator 209, and a transmitter 210.

When receiving an MIB transmitted from the base station 100, the receiver 201 retunes to the center of the band. When receiving MTC SIB1, the receiver 201 identifies a Narrowband in which MTC SIB1 is placed and retunes to the Narrowband based on the setting of the default Narrowband received from the default Narrowband setter 205, the transport block size (TBS) of MTC SIB1 received from the MIB, a Narrowband number defined by the cell ID, and a predetermined transmission period. When receiving another signal, the receiver 201 identifies a Narrowband to which the signal is allocated and retunes to the Narrowband in accordance with the scheduling (not illustrated) of MPDCCH or a predetermined pattern in MTC SIB X, based on the definition of Narrowband received from the Narrowband setter 207. The receiver 201 performs reception processing such as down converting on a reception signal received via an antenna, then outputs the signal to the demodulator 202.

The demodulator 202 demodulates the signal outputted from the receiver 201, and outputs the demodulated signal to the error correction decoder 203. The error correction decoder 203 decodes the demodulated signal outputted from the demodulator 202, and outputs an obtained reception data signal. In addition, the error correction decoder 203 outputs obtained MIB to the MIB receiver 204, and outputs MTC SIB1 to MTC SIB1 setter 206.

The MIB receiver 204 receives input of an MIB, and identifies the bandwidth, setting of PHICH, a system frame number and a transport block size (TBS) of MTC SIB1, then outputs information on the bandwidth to the default Narrowband setter 205.

The default Narrowband setter 205 refers to the information on the bandwidth inputted from the MIB receiver 204 and the default Narrowband for each band stored in a table in advance, and sets the default Narrowband. The set default Narrowband is outputted to the Narrowband setter 207 and the receiver 201.

The MTC SIB1 setter 206 receives input of an MTC SIB1, and receives a control signal for MTC including a Narrowband additional offset, then outputs the Narrowband additional offset to the Narrowband setter 207.

The Narrowband setter 207 sets the definition of Narrowband based on the bandwidth inputted from the MIB receiver 204, the default Narrowband inputted from the default Narrowband setter 205, and MTC SIB1 additional offset inputted from the setter 206. The definition of Narrowband is outputted to the transmitter 210 and the receiver 201.

The error correction encoder 208 receives input of transmission data signal (UL data signal), and performs error correction encoding on the transmission data signal, then outputs the error correction encoded signal to the modulator 209. The modulator 209 modulates the signal received from the error correction encoder 208, and outputs the modulated signal to the transmitter 210.

The transmitter 210 identifies Narrowband resource to which UL data is allocated based on the definition of Narrowband inputted from the Narrowband setter 207, and the scheduling (not illustrated) of MPDCCH or a predetermined pattern in MTC SIB X, and retunes to the Narrowband resource, then performs transmission processing such as up converting on an input signal to transmit the signal.

As described above, according to this embodiment, the default offset is specified, thus the MTC terminal is able to receive SIB1 for MTC without receiving the definition of Narrowband. When a predetermined default offset works, the default offset is not changed, or a predetermined default offset is desired to be changed, the default offset may be changed.

Also, the default offset varies with the bandwidth, setting a larger default offset for a larger bandwidth allows a greater number of users to be served for a larger bandwidth.

Also, setting the default offset to be equal to the RBG size allows the number of RBGs blocked by Narrowband to be reduced.

(Second Embodiment)

In this embodiment, when the definition of Narrowband of an MTC SIB1 and the definition of Narrowband of another signal are different, an MTC terminal with many repetitions does not receive signals other than MTC SIB1 and MIB in a subframe in which MTC SIB1 is placed. The subframe in which MTC SIB1 is placed is used for retuning for frequency hopping. In this manner, the definition of Narrowband does not have to be changed for each subframe during data reception. Also, using a subframe with a different definition of Narrowband for retuning achieves allocation in which a subframe for retuning does not have to be set separately.

<Precondition and Summary of Second Embodiment>

In addition to a terminal with a line quality equivalent to the line quality of a terminal in related art, the MTC terminals include an MTC terminal which is disposed in the underground of a building and has an extremely low line quality. In order to serve for terminals with a low line quality, enhancement of the coverage of cells is being studied. For enhancement of the coverage, repetition of a signal is being considered. Repetitive transmission of the same signal from a base station over multiple subframes causes multiple signals to be combined by an MTC terminal, thereby improving reception quality. However, even with a terminal with a line quality equivalent to the line quality of a terminal in related art, a reception quality equivalent to that of a terminal in related art may not be ensured due to restriction of the bandwidth to Narrowband, a low frequency diversity effect, or a simple antenna structure. The repetition also is effective for such an MTC terminal. Depending on a line quality, some terminals need large repetition, some terminals need small repetition, and some terminals need no repetition. For a terminal which needs large repetition, placing a signal on consecutive subframes at the same frequency by the same mapping allows received signals to be combined by a method called I/Q combining, and the reception quality can be improved. Also, the following approach is being studied: frequency hopping is applied, Narrowband used for transmission and reception is changed every certain cycle, and a frequency diversity gain is obtained. When Narrowband is changed, a certain time period is needed for retuning. Also, multiple hopping patterns are shared between the base station and the terminal in advance, and a Narrowband, on which hopping is performed, is determined beforehand for each hopping pattern. In this case, downlink control information (DCI) transmitted via an enhanced physical downlink control channel (EPD-CCH) for MTC terminal notifies of a frequency hopping pattern to be assigned.

However, when the definition of Narrowband included in the frequency hopping pattern is different from the definition of Narrowband for MTC SIB1, there is a problem in that conflict occurs between part of Narrowband included in the frequency hopping pattern and MTC SIB1.

Thus, in this embodiment, in order to avoid conflict between part of Narrowband included in the frequency hopping pattern and MTC SIB1, a subframe in which MTC SIB1 is placed is used for retuning.

<Operation>

The base station and the MTC terminal share the definition of Narrowband in which MTC SIB1 is placed in advance. A sharing method in the first embodiment may be used, or another method may be used, for instance, Narrowband may be allocated from an end of the band. Also, the definition of Narrowband for receiving signals other than MTC SIB1 and the MIB is notified via MTC SIB1. The MIB along with FDD and TDD is placed on subframe #0. In MTC SIB1, the subframes #0, #4, #5, #9 are candidates for FDD, and the subframes #0, #1, #5, #6 are candidates for TDD. The scheduling information on MTC SIB X other than MTC SIB1 may be included in MTC SIB1. It is assumed that the MTC terminal recognizes where MTC SIB1 is placed in frequency (PRB) and time direction (subframe) in advance. The transmission period of MTC SIB1 may include 20 m sec, 40 msec, and 80 msec.

<Operation Example 1 of Large Repetition>
<<Frequency Hopping Period of 5 for FDD>>

Figure 11:
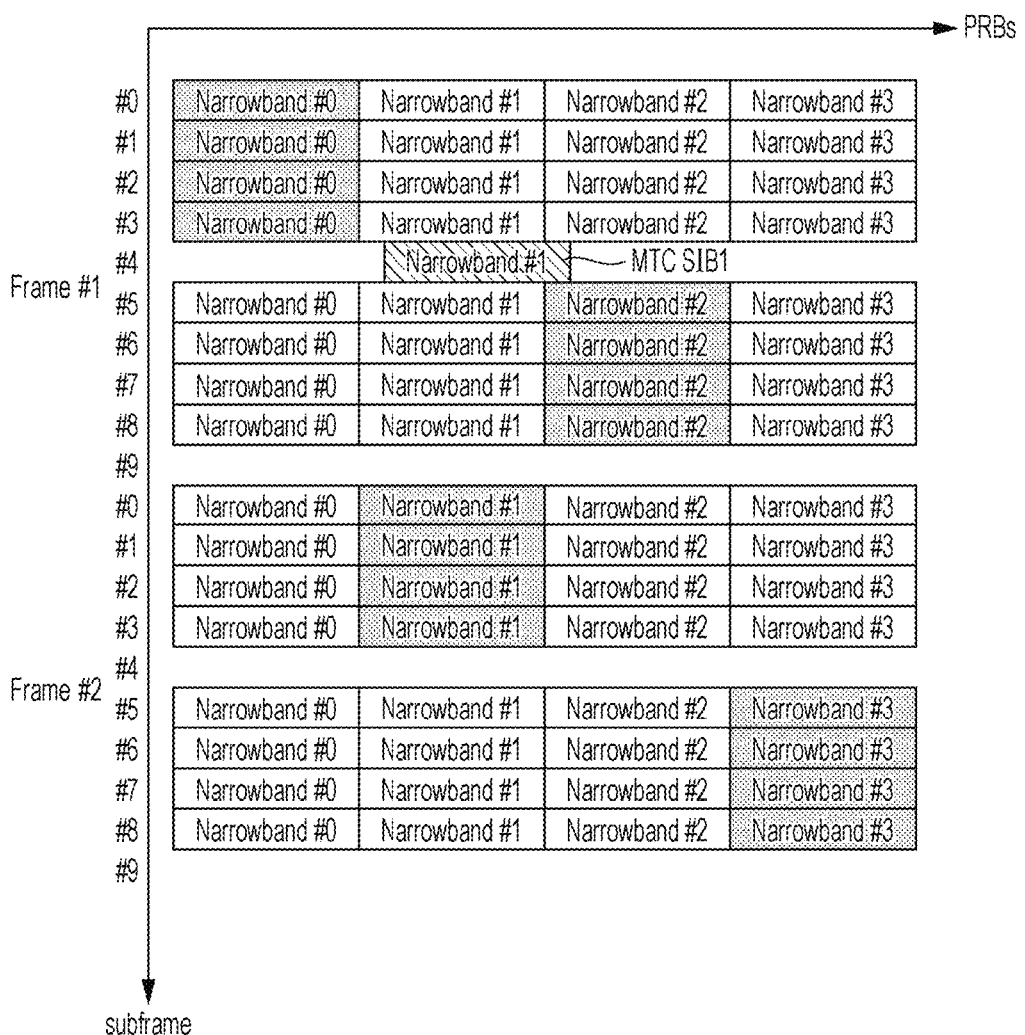
FIG. 11 is a diagram illustrating an operation example of FDD with a frequency hopping period of 5.

FIG. 11 is a diagram illustrating an example of FDD with a frequency hopping period of 5. It is assumed that MTC SIB1 is placed on subframe #4 of Frame #1. In the case of a frequency hopping period of 5 of MTC terminal, switching of the frequency hopping for DL is set to subframe #4 and 5th subsequent subframe, that is, subframe #9 in which an MTC SIB may be placed. The MTC terminal receives a signal by the same Narrowband for subframe #0 to subframe #3, performs retuning on the subframe #4, and receives a signal by the same Narrowband for subframe #5 to subframe #8.

In FIG. 11, the MTC terminal receives a signal by Narrowband #0 for subframe #0 to subframe #3 of Frame #1, receives a signal by Narrowband #2 for subframe #5 to subframe #8, receives a signal by Narrowband #1 for subframe #0 to subframe #3 of Frame #2, and receives a signal by Narrowband #3 for subframe #5 to subframe #8. The definition of Narrowband is different in the subframe in which MTC SIB1 is placed. The MTC terminal during data reception is assumed to have received MTC SIB1, thus retuning is not needed to the Narrowband in which MTC SIB1 is placed. Only the MTC terminal which is during setting of communication and which is to receive MTC SIB1 may perform retuning to the Narrowband in which MTC SIB1 is placed. Also, a PRB in which MTC SIB1 is not placed may be allocated to a terminal in related art or to an MTC terminal on which repetition is not performed.

<<Frequency Hopping Period of 10 for FDD>>

Figure 12:
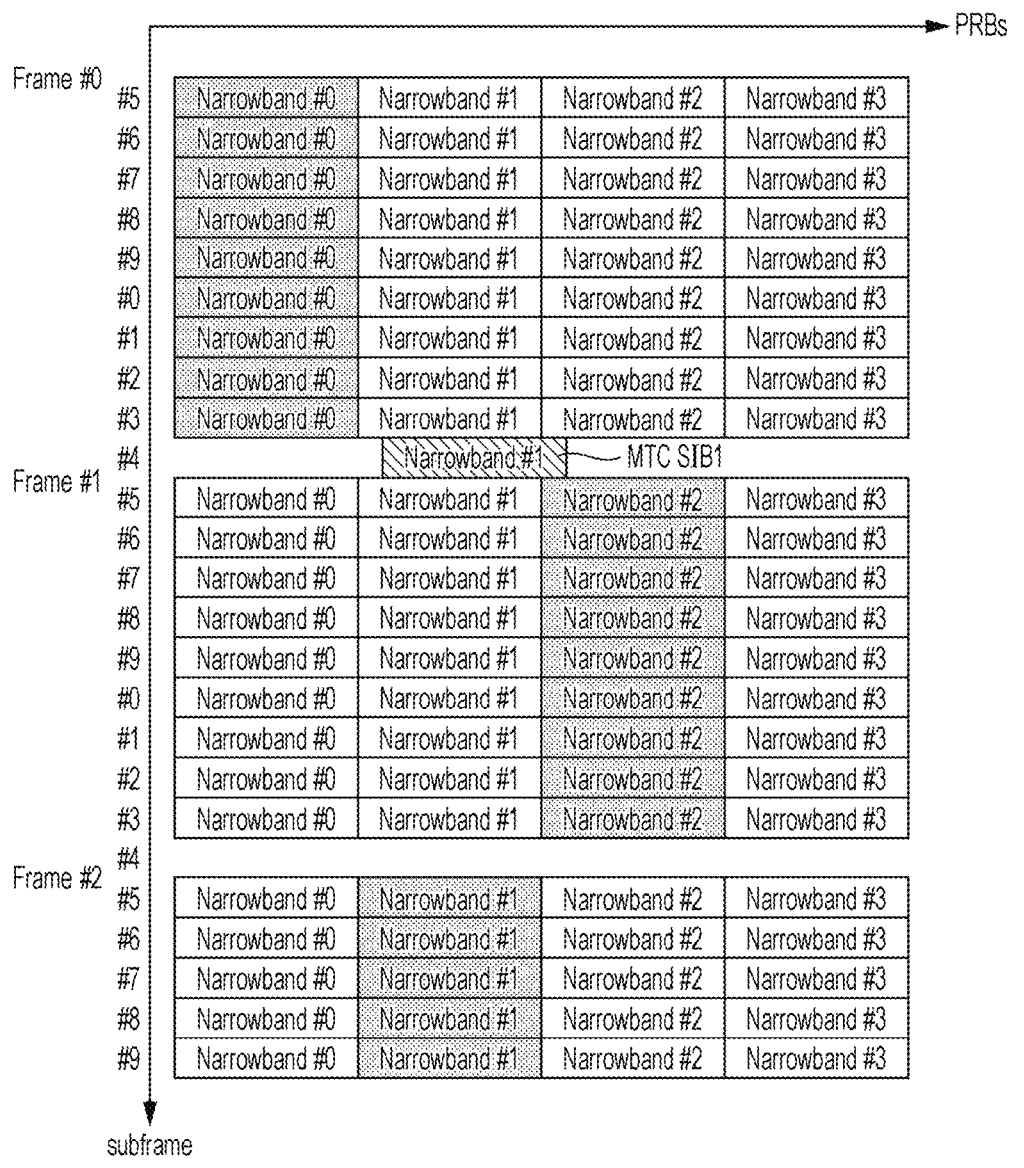

FIG. 12 is a diagram illustrating an example of FDD with a frequency hopping period of 10. It is assumed that MTC SIB1 is placed on subframe #4 of Frame #1. In the case of a frequency hopping period of 10 of MTC terminal, switching of the frequency hopping for DL is set to subframe #4 in which an MTC SIB may be placed. The MTC terminal receives a signal by the same Narrowband for subframe #5 to subframe #3, performs retuning on the subframe #4, and receives a signal by the same Narrowband for the next subframe #5 to subframe #3. FIG. 12 illustrates that the MTC terminal receives a signal by Narrowband #0 for subframe #5 of Frame #0 to subframe #3 of Frame #1, and receives a signal by Narrowband #2 for subframe #5 of Frame #1 to subframe #3 of Frame #2.

Although UL and DL are in different bands, retuning is performed in the same subframe, and UL is transmitted via a Narrowband with the same definition as the definition for DL, and the interval between UL and DL is thereby maintained between before retuning and after retuning.

<<Frequency Hopping Period of 5 for TDD>>

Figure 13:
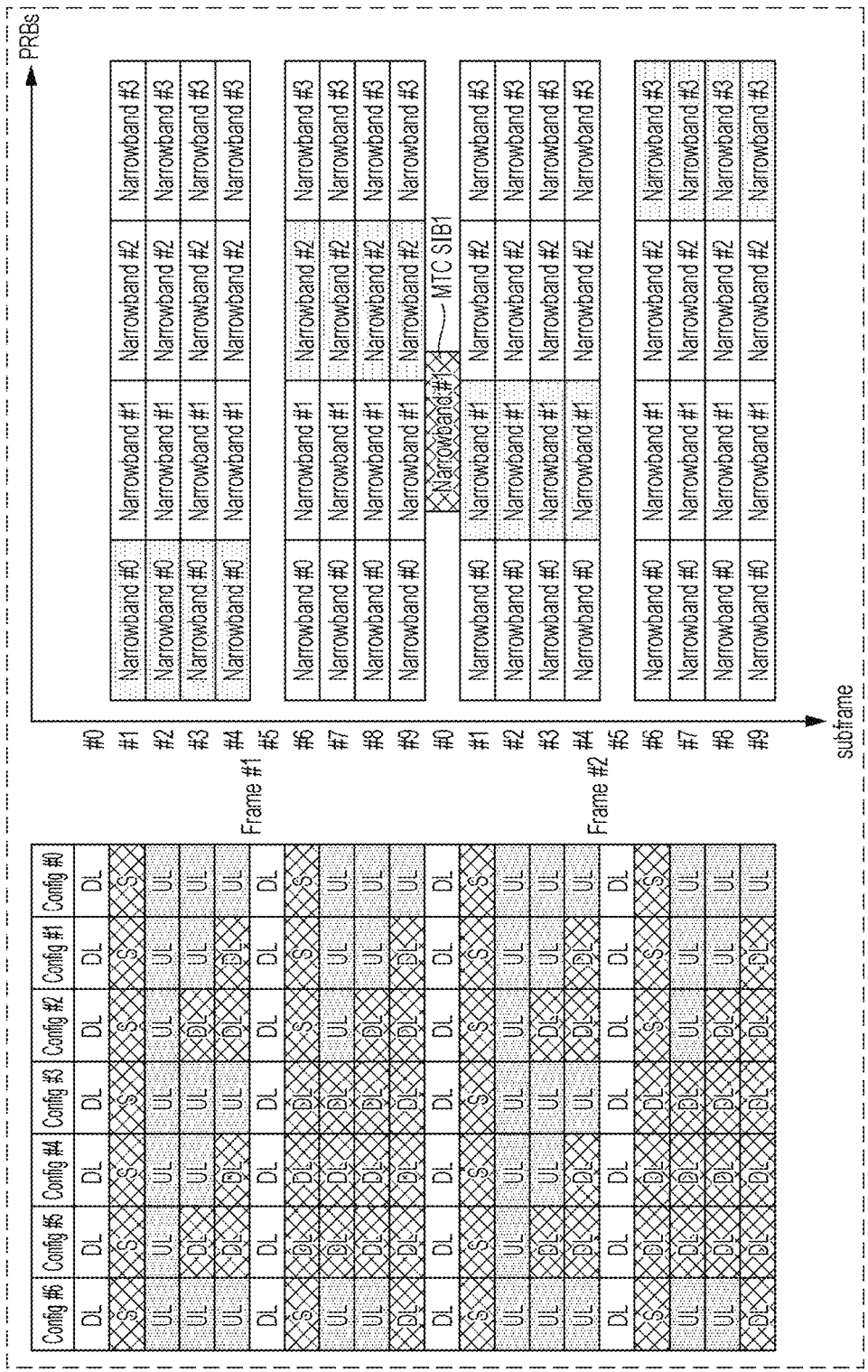
FIG. 13 is a diagram illustrating an operation example of TDD with a frequency hopping period of 5.

In the case of TDD, placement of DL and UL are different depending on UL/DL configuration. FIG. 13 illustrates an example of TDD with a frequency hopping period of 5. It is assumed that MTC SIB1 is placed on subframe #0 of Frame #2. In the case of a frequency hopping period of 5 of MTC terminal, switching of the frequency hopping for DL is set to subframe #0 and 5th subsequent subframe, that is, subframe #5 in which an MTC SIB may be placed. The MTC terminal transmits and receives a signal by the same Narrowband for subframe #1 to subframe #4, performs retuning on the subframe #5, and transmits and receives a signal by the same Narrowband for subframe #6 to subframe #9. As illustrated in FIG. 13, the numbers of ULs and DLs included in consecutive subframes are varied with the UL/DL configuration. Particularly in this setting, since DL subframes are used for retuning, the number of subframes usable for receiving DL is low. Particularly, in UL/DL config #0, no DL subframe is usable for receiving DL, and thus reception data has to be allocated in DwPTS in Special subframe.

Figure 14:
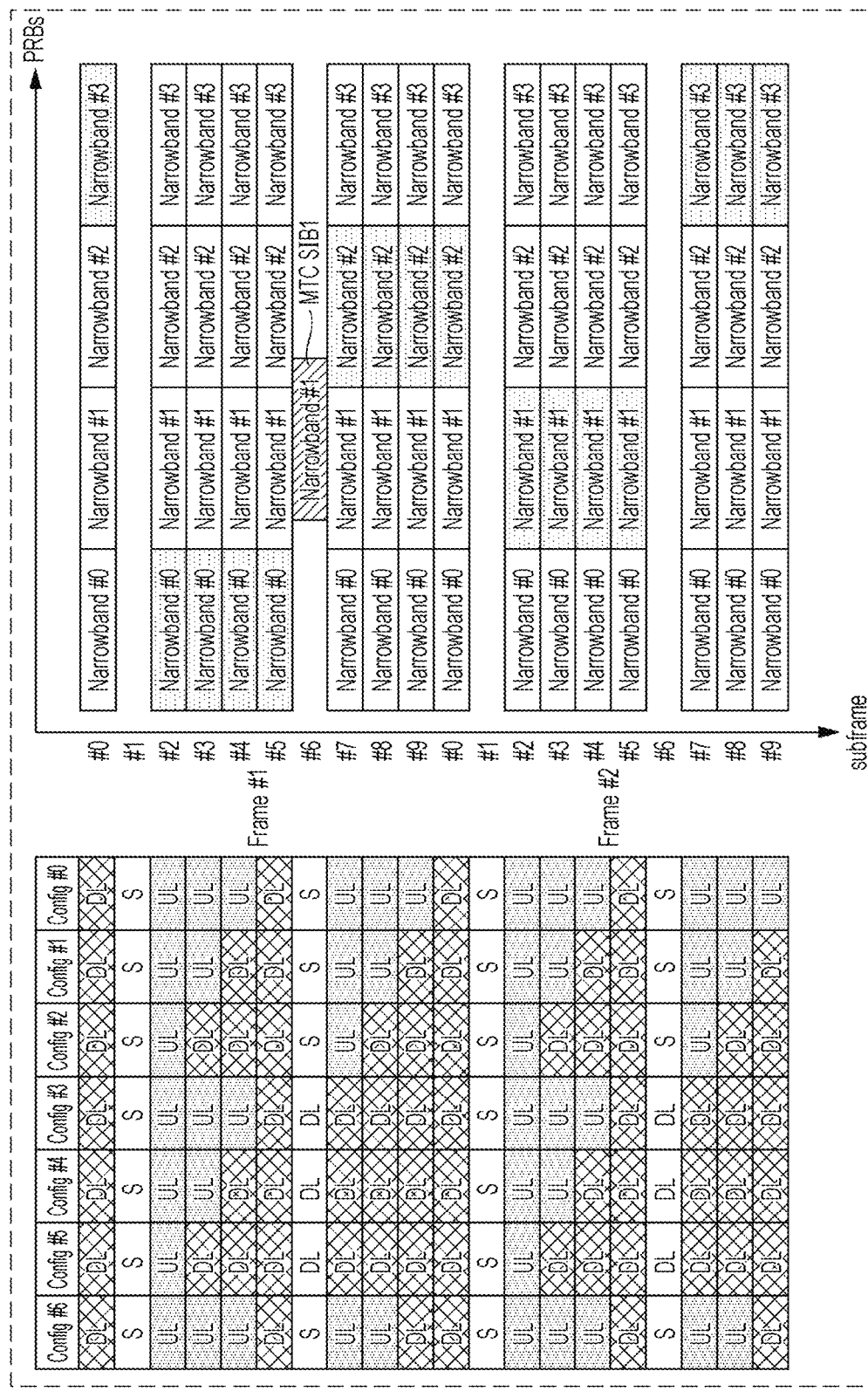
FIG. 14 is a diagram illustrating an operation example of TDD with a frequency hopping period of 5.

Thus, when a subframe in which MTC SIB1 is placed is set to subframe #1 or subframe #6, and a subframe used for retuning is set to subframe #1 and the subframe #6, as illustrated in FIG. 14, the number of subframes usable for DL is increased. In FIG. 14, the MTC SIB is placed on subframe #6 of Frame #1.

<<Frequency Hopping Period of 10 for TDD>>

Figure 15:
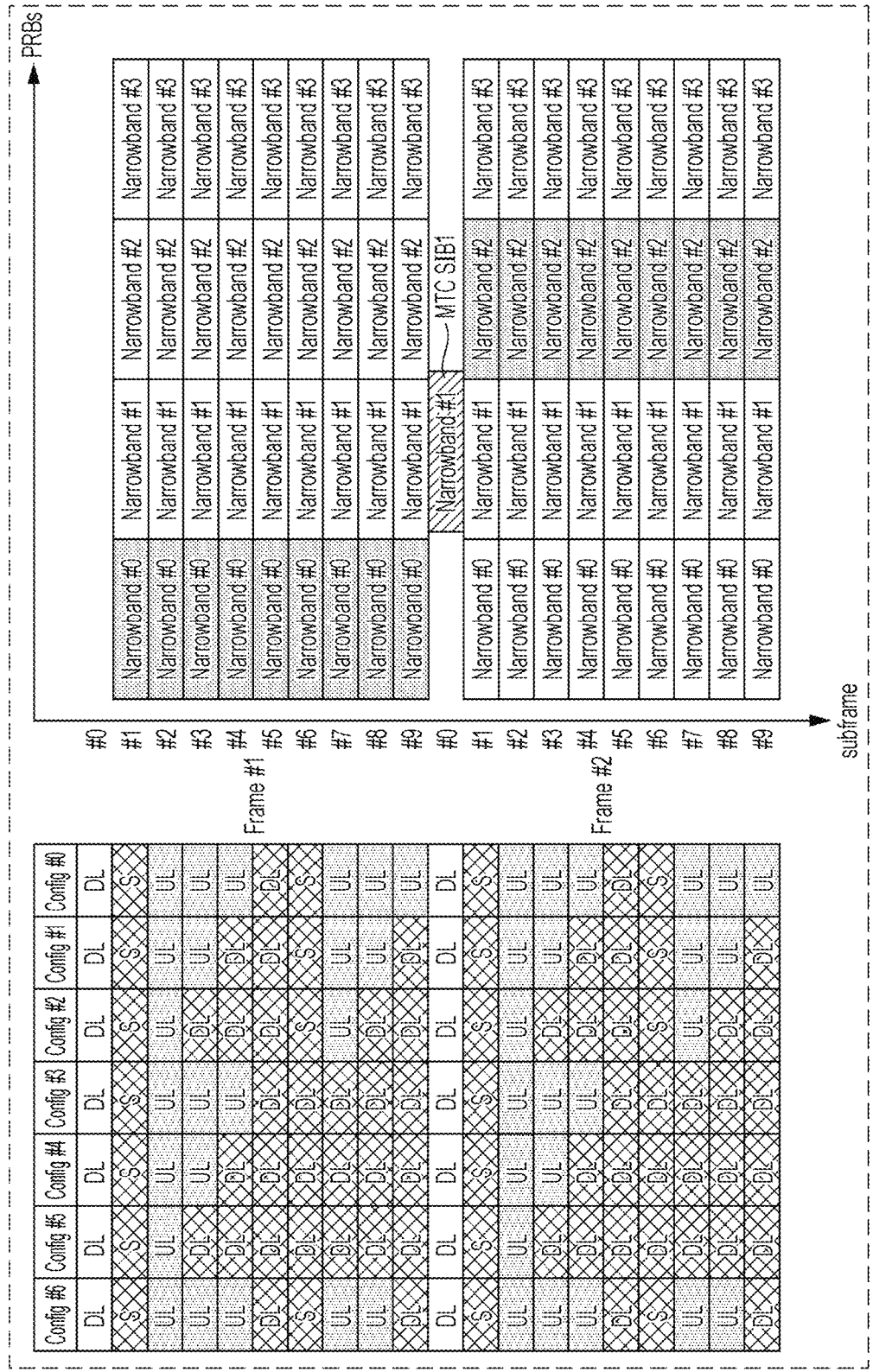
FIG. 15 is a diagram illustrating an operation example of TDD with a frequency hopping period of 10.

FIG. 15 illustrates an example of TDD with a frequency hopping period of 10. It is assumed that MTC SIB1 is placed on subframe #0 of Frame #2. In the case of a frequency hopping period of 10 of MTC terminal, switching of the frequency hopping for DL is set to subframe #0 in which MTC SIB1 may be placed. The MTC terminal receives a signal by the same Narrowband for subframe #1 to subframe #9. As illustrated in FIG. 15, the numbers of ULs and DLs included in consecutive subframes are varied with the UL/DL configuration. Similarly to case of a frequency hopping period of 5, when a subframe in which MTC SIB1 is placed is set to subframe #1 or subframe #6, and a subframe used for retuning is set to one of subframe #1 and the subframe #6, the number of subframes usable for DL can be increased.

<Operation of MTC Terminal with Small Repetition/No Repetition>

Figure 16:
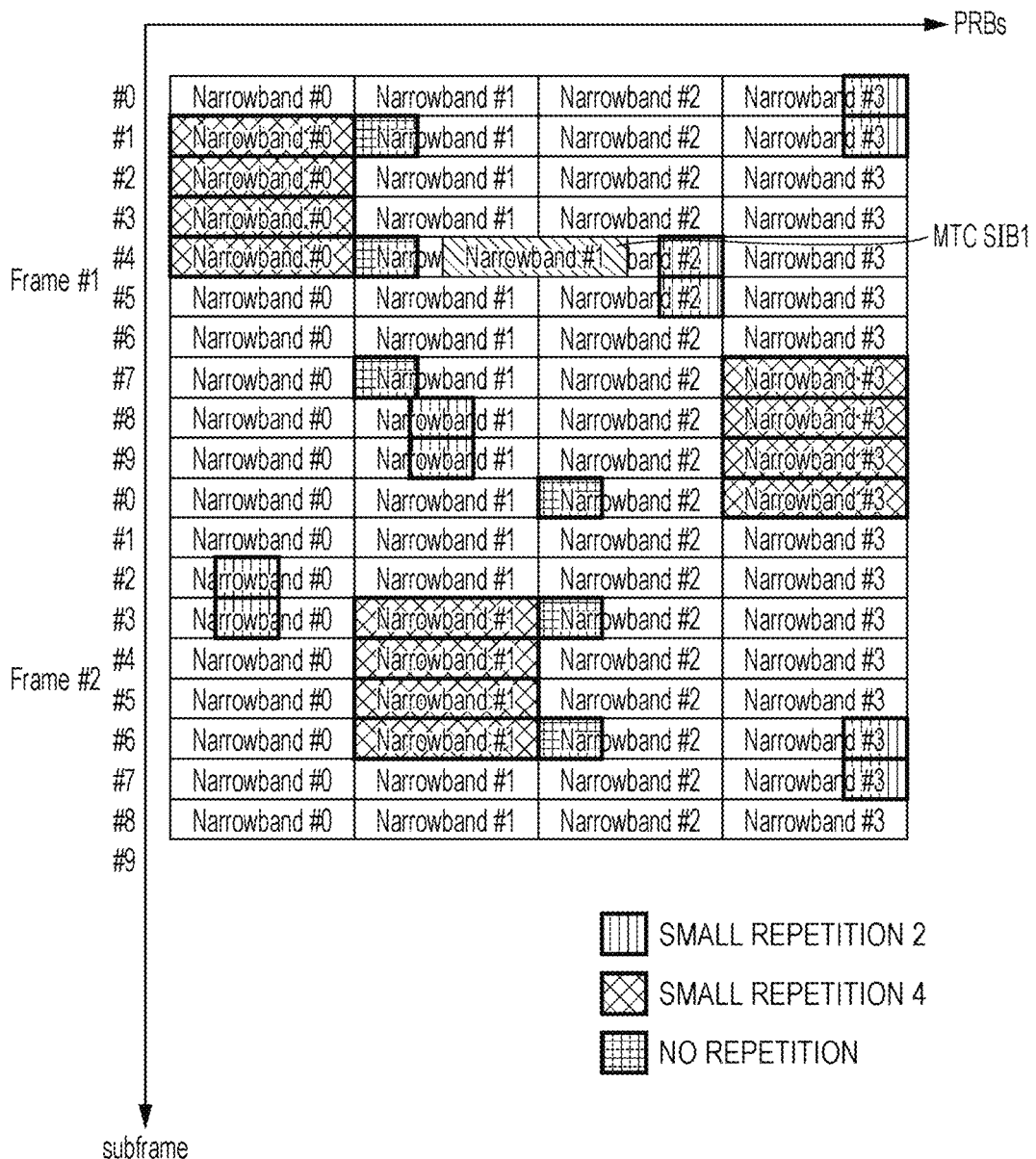
FIG. 16 is a diagram illustrating an operation example of an MTC terminal of Small repetition or no repetition.

In an MTC terminal which needs large repetition, a subframe to which MTC SIB1 is transmitted is used for retuning. In contrast, in an MTC Terminal with small repetition or no Repetition, resources may be allocated for each data using downlink control information (DCI). Thus, in these MTC terminals, a subframe in which MTC SIB1 is placed is also used for data allocation. FIG. 16 illustrates an operation example. The MTC SIB1 is placed on subframe #4 of Frame #1. The Narrowband in which MTC SIB1 is placed conflicts with part of Narrowband #1 and Narrowband #2 to which other data is allocated.

Small repetition 2 indicates the number of repetitions is 2, and data is allocated to the same resource for 2 consecutive subframes. In this process, scheduling may be made to avoid the resource in which MTC SIB1 is placed so that conflict with MTC SIB1 is avoidable. In subframe #4 of Frame #1, resources are allocated to part of Narrowband #2. Although MTC SIB1 is placed on part of Narrowband#2, resources are allocatable to Narrowband #2 for a different PRB.

Small repetition 4 indicates the number of repetitions is 4, and resources are allocated to all PRBs in Narrowband. In this case, a subframe in which the MTCSIB1 is placed is also usable by performing scheduling to avoid the Narrowband in which MTC SIB1 is placed. However, resources cannot be placed on Narrowband#1 and Narrowband#2, with which MTC SIB1 conflicts, of subframe #4 in Frame#1.

No repetition indicates that repetition is not performed. Similarly to Small repetition 2, scheduling may be made to avoid the resource in which MTC SIB1 is placed so that conflict with MTC SIB1 is avoidable.

When conflict with MTC SIB1 is avoidable by scheduling like this, the subframe in which MTC SIB1 is placed can be used for data allocation of an MTC terminal.

<Operation Example 2 of Large Repetition>

Figure 17:
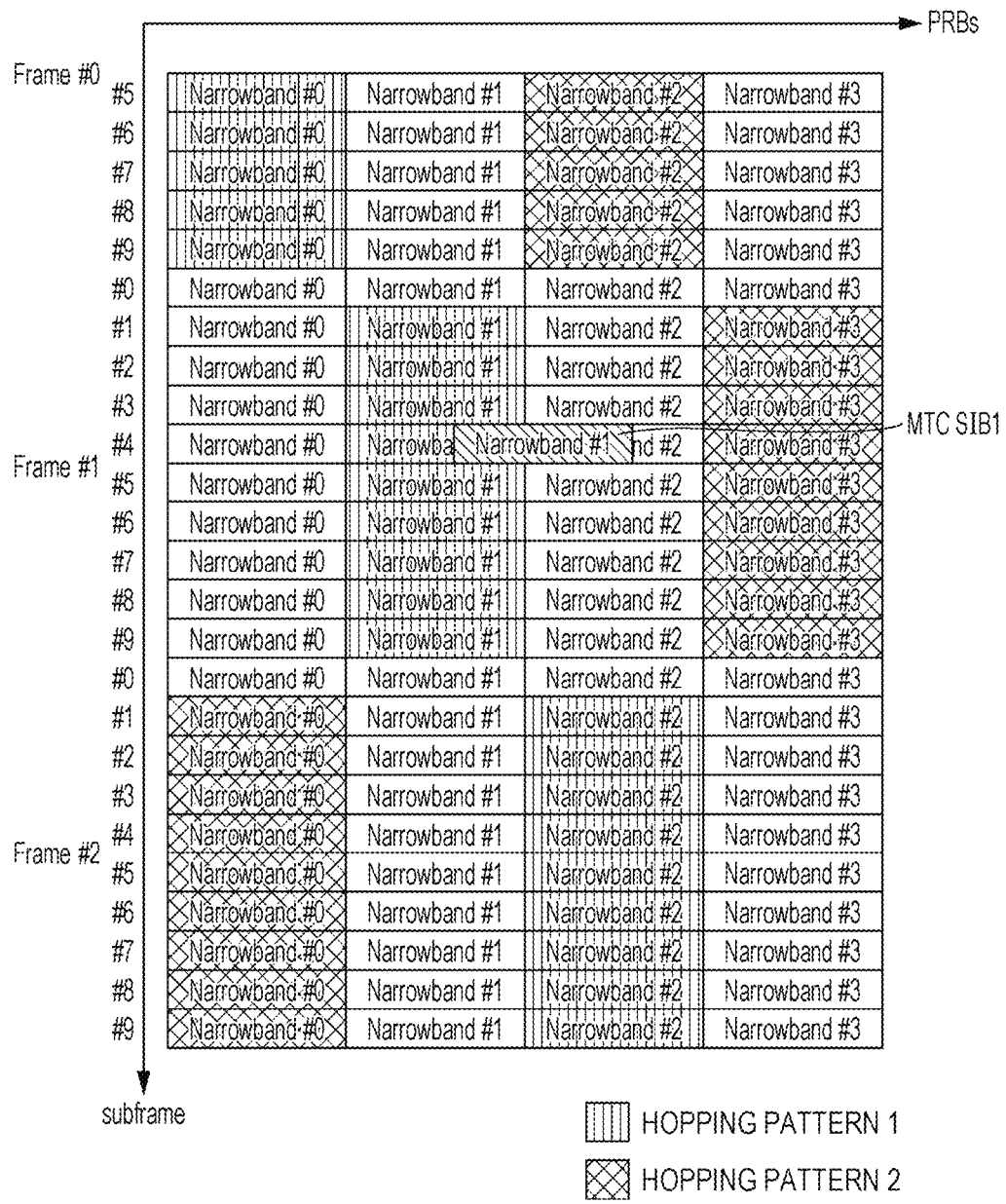
FIG. 17 is a diagram illustrating an operation example in which retuning is not performed on subframe in which MTC SIB1 is placed.

FIG. 17 illustrates an example in which retuning is not performed on a subframe in which MTC SIB1 is placed, the example being different from the operation example 1 of Large repetition. In FIG. 17, 2 hopping patterns (hopping pattern 1 and hopping pattern 2) are predetermined. The hopping pattern 1 conflicts with MTC SIB1 in subframe #4 of Frame #1. Since the MTC terminal recognizes the resources in which MTC SIB is placed, recognizes data puncturing in units of PRB, and combines data without using PRBs in conflict. Since hopping pattern 2 allows hopping on Narrowband which is not overlapped with MTC SIB1, data allocation is not affected by the placement of MTC SIB.

Like this, the operation example 2 has an advantage in that the resources usable for data allocation for the MTC terminals increases.

As described above, according to this embodiment, signals other than SIB 1 are not allocated the subframe in which SIB 1 is placed, and the subframe to which SIB 1 is allocated is used for switching of the frequency band in frequency hopping of signals other than SIB 1, and thus the definition of Narrowband does not have to be changed for each subframe during data reception. Also, using a subframe with a different definition of Narrowband for retuning achieves allocation in which a subframe for retuning does not have to be set separately.

Also, in an MTC terminal with a small number of repetitions, resources are allocated to a subframe in which MTC SIB is placed, and thus the resources not allocatable to an MTC terminal with a large number of repetitions can be effectively used.

When the definitions of Narrowband of MTC SIB1 and Narrowband of another signal are different, and another signal is allocated to the resource in which MTC SIB1 is placed, puncturing is performed on PRB which conflict with MTC SIB1 in units of PRB for another signal, and thus resources allocatable to an MTC terminal with a small number of repetitions are increased in number, and the flexibility of allocation improves.

<Other Embodiments>

In the embodiments described above, a control signal received subsequent to MIB by the MTC terminal is MTC SIB1, and MTC SIB1 includes information for receiving other MTC SIBX (X>=2). However, SIB for MTC may be combined into one and may be receive as MTC SIB. In this case, the MTC SIB1 is replaced by MTC SIB.

The value of additional offset in the first embodiment is an example, and another offset may be set. Also, although 4 types of offsets can be set with 2 bits, the number of bits may be increased to achieve more types of offset setting, otherwise 2 types offset setting by 1 bit may be adopted.

Although the bandwidth of Narrowband is set to 3 PRBs or greater, without being limited to this, the bandwidth may be 1 PRB or greater, or 6 PRBs only.

The data transmitted and received by Narrowband is assumed to include SIB for MTC, Paging, RACH response, message 4, EPDCCH (MPDCCH) for MTC, DL data channel (MPDSCH) for MTC, and UL data channel (MPUSCH) for MTC.

In the operation example 2 of Large repetition in the second embodiment, puncturing is performed in units of PRB. However, puncturing may be performed on resources in conflict in units of Narrowband.

Also, an aspect of the present disclosure is not limited to the embodiments, and the embodiments may be modified in various manners and implemented.

In the above-described embodiments, an example in which an aspect of the present disclosure is configured by hardware, has been described. However, the present disclosure may be implemented in software in cooperation with hardware.

Each of the functional blocks used for the description of the above embodiments is typically implemented as an LSI which is an integrated circuit. The integrated circuit may control each functional block which has been used for description of the embodiments, and may include input and an output. The integrated circuit may be individually implemented as a single chip, or a single chip may include part or all of the integrated circuits. Here, the integrated circuit is referred to as LSI, however, may be referred to as IC, LSI, super LSI, or ultra LSI depending on the degree of integration.

The technique for circuit integration is not limited to LSI, and the circuit integration may be achieved with a dedicated circuit or a general-purpose processor. A field programmable gate array (FPGA) which can be programmed after an LSI is manufactured, or a reconfigurable processor for which connection and setup of the circuit cells inside the LSI can be reconfigured may be utilized.

Furthermore, in the case where new technology of circuit integration which replaces the LSI is invented due to the progress of semiconductor technology or other emerging technology, naturally, a functional block may be integrated using the technology. Application of biotechnology may have such potential.

The base station of the present disclosure includes: a first setting circuitry that sets a first Narrowband for allocating a system information block (SIB) 1 for MTC by using a predetermined default offset; a second setting circuitry that sets a second Narrowband for allocating a signal other than the SIB 1 by using the default offset and an additional offset that indicates a difference from the default offset; and an allocating circuitry that allocates the SIB 1 including the additional offset to the first Narrowband, and allocates the signal other than the SIB 1 to the second Narrowband.

In the base station of the present disclosure, the default offset varies with a bandwidth, and the default offset is larger for a larger bandwidth.

In the base station of the present disclosure, the default offset is equal to a resource block group (RBG) size.

In the base station of the present disclosure, the signal is not allocated to a subframe in which the SIB 1 is placed, and the subframe to which the SIB 1 is allocated is used for switching between frequency bands in frequency hopping of the signal.

In the base station of the present disclosure, in a subframe in which the SIB 1 is placed, the signal is allocated to a resource other than a resource to which the SIB 1 is allocated.

In the base station of the present disclosure, in a subframe in which the SIB1 is placed, puncturing is performed on the signal allocated to a resource to which the SIB 1 is allocated.

The terminal of the present disclosure includes: a first setting circuitry that sets a first Narrowband for allocating a system information block (SIB) 1 for MTC by using a predetermined default offset; a second setting circuitry that sets a second Narrowband for allocating a signal other than the SIB 1 by using the default offset and an additional offset that is included in the SIB 1 and indicates a difference from the default offset; and a transmitter and receiver that receives the SIB 1 by the first Narrowband, and transmits and receives a signal other than the SIB 1 by the second Narrowband.

The communication method of the present disclosure includes: setting a first Narrowband for allocating a system information block (SIB) 1 for MTC by using a predetermined default offset; setting a second Narrowband for allocating a signal other than the SIB 1 by using the default offset and an additional offset that indicates a difference from the default offset; and allocating the SIB 1 including the additional offset to the first Narrowband, and allocates the signal other than the SIB 1 to the second Narrowband.

The communication method of the present disclosure includes: setting a first Narrowband for allocating a system information block (SIB) 1 for MTC by using a predetermined default offset; receiving the SIB 1 in the first Narrowband; setting a second Narrowband for allocating a signal other than the SIB 1 by using the default offset and an additional offset that is included in the SIB 1 and indicates a difference from the default offset; and transmitting and receiving the signal by the second Narrowband.

An aspect of the present disclosure is applicable to a base station, a terminal, and a communication method that perform machine-type communications (MTC).

What is claimed is:

1. A base station comprising:
a first setting circuitry which, in operation, sets a first Narrowband for allocating a system information block (SIB) 1 for Machine-Type Communications (MTC) by using a predetermined default offset;
a second setting circuitry which, in operation, sets a second Narrowband, for allocating a signal other than the SIB 1 by using the default offset and an additional offset that indicates a difference from the default offset; and
an allocating circuitry which, in operation, allocates the SIB 1 including the additional offset to the first Narrowband, and, in operation, allocates the signal other than the SIB 1 to the second Narrowband.

2. The base station according to claim 1,
wherein the default offset varies with a bandwidth, and the default offset is larger for a larger bandwidth.

3. The base station according to claim 1,
wherein the default offset is equal to a resource block group (RBG) size.

4. The base station according to claim 1,
wherein the signal is not allocated to a subframe in which the SIB 1 is placed, and
the subframe to which the SIB 1 is allocated is used for switching between frequency bands in frequency hopping of the signal.

5. The base station according to claim 1,
wherein in a subframe in which the SIB 1 is placed, the signal is allocated to a resource other than a resource to which the SIB 1 is allocated.

6. The base station according to claim 1,
wherein in a subframe in which the SIB 1 is placed, puncturing is performed on the signal allocated to a resource to which the SIB 1 is allocated.

7. A terminal comprising:
a first setting circuitry which, in operation, sets a first Narrowband tbr allocating a system information block (SIB) 1 for Machine-Type Communications (MTC) by using a predetermined default offset;
a second setting circuitry which, in operation, sets a second Narrowband for allocating a signal other than the SIB 1 by using the default offset and an additional offset that is included in the SIB 1 and indicates a difference from the default offset; and
a transmitter and receiver which, in operation, receives the SIB 1 on the first Narrowband, and, in operation, transmits and receives a signal other than the SIB 1 on the second Narrowband.

8. The terminal according to claim 7,
wherein the default offset varies with a bandwidth, and the default offset is larger for a larger bandwidth.

9. The terminal according to claim 7,
wherein the default offset is equal to a resource block group (RBG) size.

10. The terminal according to claim 7,
wherein the signal is not allocated to a subframe in which the SIB 1 is placed, and
the subframe to which the SIB 1 is allocated is used for switching between frequency bands in frequency hopping of the signal.

11. The terminal according to claim 7,
wherein in a subframe in which the SIB 1 is placed, the signal is allocated to a resource other than a resource to which the SIB 1 is allocated.

12. The terminal according to claim 7,
wherein in a subframe in which the SIB 1 is placed, puncturing is performed on the signal allocated to a resource to which the SIB 1 is allocated.

13. A communication method carried out by a base station apparatus, the method comprising:
setting a first Narrowband for allocating a system information block (SIB) 1 for Machine-Type Communications (MTC) by using a predetermined default offset;
setting a second Narrowband for allocating a signal other than the SIB 1 by using the default offset and an additional offset that indicates a difference from the default offset; and
allocating the SIB 1 including the additional offset to the first Narrowband, and allocating the signal other than the SIB 1 to the second Narrowband.

14. A communication method carried out by a terminal apparatus, the method comprising:
setting a first Narrowband for allocating a system information block (SIB) 1 for Machine-Type Communications (MTC) by using a predetermined default offset;
receiving the SIB 1 in the first Narrowband;
setting a second Narrowband for allocating a signal other than the SIB 1 by using the default offset and an additional offset that is included in the SIB 1 and indicates a difference from the default offset; and
transmitting and receiving the signal other than the SIB 1 in the second Narrowband.

* * * * *